United States Patent
Shenoi et al.

(10) Patent No.: US 10,142,044 B2
(45) Date of Patent: Nov. 27, 2018

(54) MANAGED TIMING ENGINE

(71) Applicant: QULSAR, INC., San Jose, CA (US)

(72) Inventors: Kishan Shenoi, Saratoga, CA (US);
Shashi Kumar, Saratoga, CA (US);
Ben Entezam, Coto de Caza, CA (US)

(73) Assignee: QULSAR, INC., San Jose, CA (US)

( * ) Notice: Subject to any disclaimer, the term of this patent is extended or adjusted under 35 U.S.C. 154(b) by 0 days.

(21) Appl. No.: 14/220,305

(22) Filed: Mar. 20, 2014

(65) Prior Publication Data
US 2014/0286357 A1 Sep. 25, 2014

Related U.S. Application Data

(60) Provisional application No. 61/803,666, filed on Mar. 20, 2013.

(51) Int. Cl.
*H04J 3/06* (2006.01)

(52) U.S. Cl.
CPC ........... *H04J 3/0688* (2013.01); *H04J 3/0667* (2013.01); *H04J 3/0697* (2013.01)

(58) Field of Classification Search
None
See application file for complete search history.

(56) References Cited

U.S. PATENT DOCUMENTS

| | | | | |
|---|---|---|---|---|
| 5,982,831 A | * | 11/1999 | Chu | H04J 3/0688 331/11 |
| 2009/0167384 A1 | * | 7/2009 | Sohn | G06G 7/16 327/156 |
| 2011/0134766 A1 | * | 6/2011 | Zampetti | H04J 3/0682 370/252 |
| 2012/0005517 A1 | * | 1/2012 | Foster | G06F 1/10 713/500 |
| 2012/0020417 A1 | * | 1/2012 | Wei | H04J 3/0638 375/259 |
| 2012/0275317 A1 | * | 11/2012 | Geva | H04J 3/0667 370/250 |

* cited by examiner

*Primary Examiner* — Noel R Beharry
*Assistant Examiner* — Ruihua Zhang
(74) *Attorney, Agent, or Firm* — John Bruckner PC

(57) ABSTRACT

A Managed Timing Engine (MTE) provides a primary timing output synchronized to a selected input reference from a multiplicity of input references. Additional timing outputs can be generated such that there is a programmable frequency offset (in ppb) between them and the main output. The rate (in Hz) of the outputs can be programmable. The MTE can introduce a programmable delay for periodic phase references.

14 Claims, 9 Drawing Sheets

Grandmaster Clock supported by a Managed Timing Engine

Slave clock supported by a Managed Timing Engine

Managed Timing Engine

Programmable Offset for 1PPS

Enhanced Programmable Divider

Phase-locked-loop

Cascaded Phase-Locked Loops

Key elements of a Managed Timing Engine for PTP (425/525)

DPLL for frequency offset measurement

MANAGED TIMING ENGINE

CROSS-REFERENCE TO RELATED APPLICATION

Referring to the application data sheet filed herewith, this application claims a benefit of priority under 35 U.S.C. 119(e) from co-pending provisional patent application U.S. Ser. No. 61/803,666, filed Mar. 20, 2013, the entire contents of which are hereby expressly incorporated herein by reference for all purposes.

BACKGROUND

Embodiments of this disclosure relate generally to time and frequency alignment systems including those operating over packet-switched communications networks and, more specifically, to methods and apparatus for enabling multiple timing domains.

Packet-based timing methods are becoming essential for delivering timing over packet-switched networks, often referred to as the cloud. In particular, Precision Timing Protocol (PTP) (aka IEEE 1588-2008) is becoming a defacto standard for delivering timing information (time/phase/frequency) from a Grand Master (GM) clock to slave clocks in end application-specific equipment; for example, where wireless base stations providing mobile telephony services require precise timing and the backhaul method of choice is Ethernet.

The Grand Master clock provides timing information over the packet-switched network to the slave clocks by exchanging packets with embedded time-stamps related to the time-of-arrival and time-of-departure of the timing packets. The slave clock utilizes this information to align its time (and frequency) with the Grand master. The Grand Master is provided an external reference to serve as the basis for time and frequency. Most commonly this reference is derived from a Global Navigation Satellite System (GNSS) such as the GPS System that in turn is controlled by the US Department of Defense and its timing controlled very precisely and linked to the US Naval Observatory. Time alignment to the GPS clock is, for all practical purposes equivalent to time alignment to UTC.

The Grand Master clock is equipped with a high stability oscillator, typically an ovenized quartz oscillator (OCXO) or a Rubidium atomic standard. The intent is to allow the clock to go into holdover mode and bridge intervals of time when the GPS system is unavailable. That is, if the GPS becomes unavailable, the GM can utilize the local oscillator to "keep time". The ability to maintain a specified accuracy is directly linked to the quality of the local oscillator.

When a GM loses its reference and goes into holdover mode the system of PTP (Precision Timing Protocol) slave clocks that are synchronizing themselves with the said GM may choose to establish an alternate GM to which they will switch to. However, this involves a significant time delay and in the duration the slave clocks could drift to the extent that the application, such as the mobile telephony system, may experience unacceptable outage.

Slave clocks can maintain communication with multiple grandmasters, typically two. Each grandmaster represents a PTP (Precision Timing Protocol) domain. In the event that one GM fails, or goes into holdover, the slave clock can switch to the other GM as its master. It is advantageous for the slave clock to maintain a dual time-base, one for each GM in order that the switchover, if necessary, can be done rapidly with minimal transient impact. In the past, this is accomplished using two or more distinct slave clocks.

In some cases other timing references are available, such as references from GPS receivers and/or frequency references derived from physical layer signals such as Synchronous Ethernet or SONET/SDH transmission links or timing inputs from the Office Building Integrated Timing Supply (BITS) that is traceable to a primary reference source (PRS). In such instances, it is advantageous to maintain multiple time-bases, one for each distinct timing reference but such functionality in the past is implemented using distinct phase-locked-loops.

SUMMARY

It is an emerging requirement for equipment, such as routers and switches that are timing-aware, to maintain multiple instances of slave clock stacks. For example, a device may function as a PTP (Precision Timing Protocol) boundary clock and be required to support different timing domains (owing to different inputs or requirements to support multiple carrier networks). An embodiment of such a function is advantageously implemented by having a local clock that can support multiple time-bases. A common clock is used and the different time-scales implemented using distinct instantiations of software clocks with the accompanying impairments.

This disclosure provides techniques for maintaining multiple time-bases associated with multiple reference signals. In one embodiment described, a high-performance oscillator is disciplined using a physical layer reference for purposes of stability. Multiple time-base outputs are generated using this underlying, stable, disciplined oscillator as a foundation element with each time-base output offset by a programmable frequency offset from the foundation.

For example, one important reference input is from GPS receivers and comprises a 1PPS (one-pulse-per-second) signal and, optionally, a time-of-day message that, for purposes of this description, identifies the time-offset from on-time of the 1PPS signal. That is, the message describes the 1PPS signal as being x ns ahead or behind the true one-second boundary. The managed timing engine provides a smoothed version of the 1PPS signal, removing jitter in the input, and adds the appropriate time shift of said x ns so that the smoothed output is on-time with the true one-second boundary.

DETAILED DESCRIPTION

Figure 1:
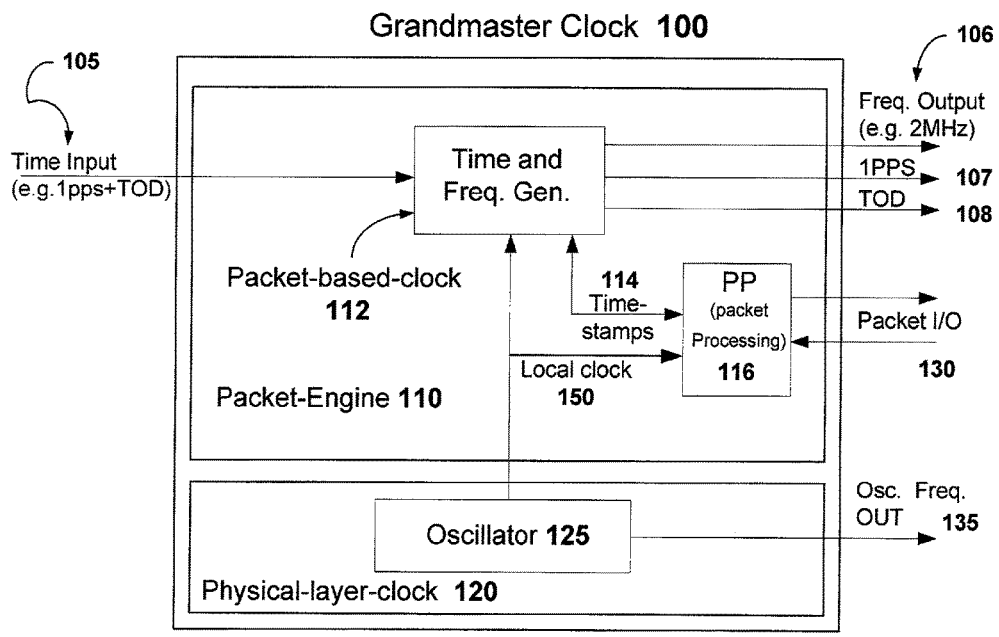
FIG. 1 is a conceptual diagram that depicts the principal functional blocks of a PTP (Precision Timing Protocol) Grandmaster clock 100.

FIG. 1 is a simplified block diagram representing a Grandmaster (GM) clock 100 (based on PTP). The GM receives a time input 105, typically in the form a 1PPS (one-pulse-per-second) signal together with a message channel indicating the precise time-of-day at the significant event (rising edge or falling edge, depending on convention) of the 1PPS signal. The time and frequency generation is done in the packet-based-clock 112 that is typically part of a greater packet engine 110. Local outputs of time and frequency (106, 107, 108) are common. The GM, acting as master, receives the precise time-stamps 114 of incoming and outgoing packets and inserts the appropriate time-stamps into outgoing packets. Time-stamping is achieved in a packet-processing function 116 that uses the local clock 150 from oscillator module 125. The oscillator module provides a physical-layer clock. Packets enter and exit the GM via traditional packet I/O methods 130, e.g. Ethernet. An output providing the physical layer clock 135 is common.

The master clock 100 provides a timing reference to down-stream slave clocks. The down-stream slave clocks are not shown in FIG. 1.

Figure 2:
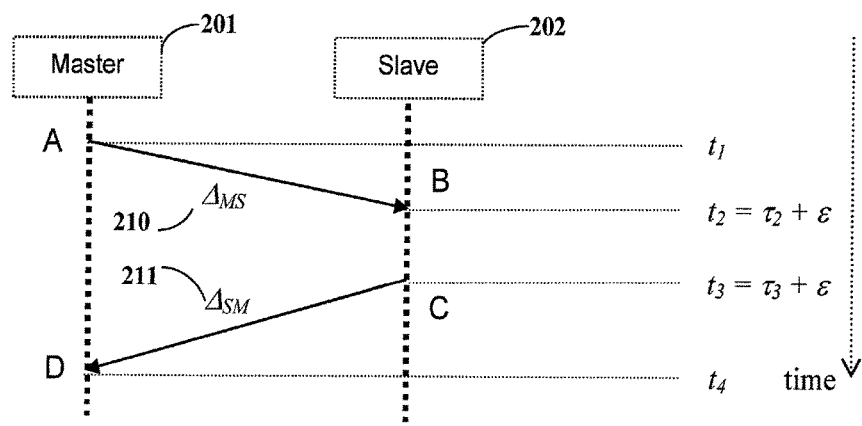
FIG. 2 identifies the time-stamps and events associated with the timing signal suitable for transferring timing from a packet-based master 201 to a packet-based slave 202.

The manner in which the slave clocks align themselves with the master is explained using FIG. 2. Packet exchanges between master and slave provide measurements of the transit delay between the two. The particular protocol employed determines the method whereby the measurements ("time-stamps") are communicated between the two entities. This protocol can be, for example, PTP or NTP (Network Time Protocol). Both are supported by packet networks in a transparent fashion.

Referring to FIG. 2, the sequence of events and important items of information associated with an exchange of packets between master and slave are:

Event A: Packet is transmitted by master and time-of-departure is $t_1$.

Event B: Packet arrives at slave that measures the time-of-arrival as $\tau_2$; assuming that the slave time offset from master (ofm) is $\varepsilon$, the actual time-of-arrival is $t_2 = \tau_2 + \varepsilon$.

Event C: Packet is transmitted by slave that notes the time-of-departure is $\tau_3$; assuming that the slave time offset from master is $\varepsilon$, the actual time-of-departure is $t_3 = \tau_3 + \varepsilon$.

Event D: Packet arrives at master that measures time-of-arrival as $t_4$.

Such a two-way exchange of packets can provide information suitable for allowing the slave to align in time with the master (assuming that both sides have knowledge of the time stamps). If the exchange of information is only one-way, from master to slave (referred to as the forward direction), the slave can still align its clock (frequency) with the master (syntonization) since the packet contains the time-of-departure from the master ($t_1$) and the slave measures the time-of-arrival ($\tau_2$). One-way methods, where the time-stamped packets flow from slave to master can be employed provided the mechanism is available for the slave to obtain the results of the master measuring time-of-arrival at the master ($t_4$).

There are four measured values that can be communicated between the master and slave, namely, ($t_1, \tau_2, \tau_3, t_4$). Note that such a two-way exchange involves one packet (message) in each direction; they do not necessarily have to be consecutive as long as the time-stamp information is communicated appropriately. In some instances the rate at which packets are transmitted in the two directions can be different. Denoting by $\Delta_{MS}$ and $\Delta_{SM}$ the transit delays between the master and slave and vice versa, the following equations can be established:

$$t_4 = \tau_3 + \varepsilon + \Delta_{SM} \text{ (from an S-to-M packet)}$$

$$t_1 = \tau_2 + \varepsilon - \Delta_{MS} \text{ (from a M-to-S packet)} \quad \text{(Eq. 1)}$$

In an actual time-transfer situation there are two equations with three unknowns so it is common to assume reciprocity of transit delay between the two devices, thereby reducing the number of unknowns to 2 and therefore computing $\varepsilon$, the slave time offset from master from (Eq. 2).

$$\varepsilon = \frac{(t_4 + t_1) - (\tau_3 + \tau_2)}{2} = \frac{(t_4 + \tau_3) - (\tau_2 + t_1)}{2} \quad \text{(Eq. 2)}$$

Because of the fundamental statistical behavior of packet networks, the transit delays are not fixed and can vary from packet to packet. To counter this packet delay variation, as well as to account for any drift in the slave clock oscillator, the estimates of clock offset are made routinely and it is well known that the mitigation of the deleterious effects of packet delay variation and oscillator drift is improved by using more frequent exchanges of timing packets. Ordinary slaves 120 develop their estimate of time offset from master based on (Eq. 2).

Figure 3:
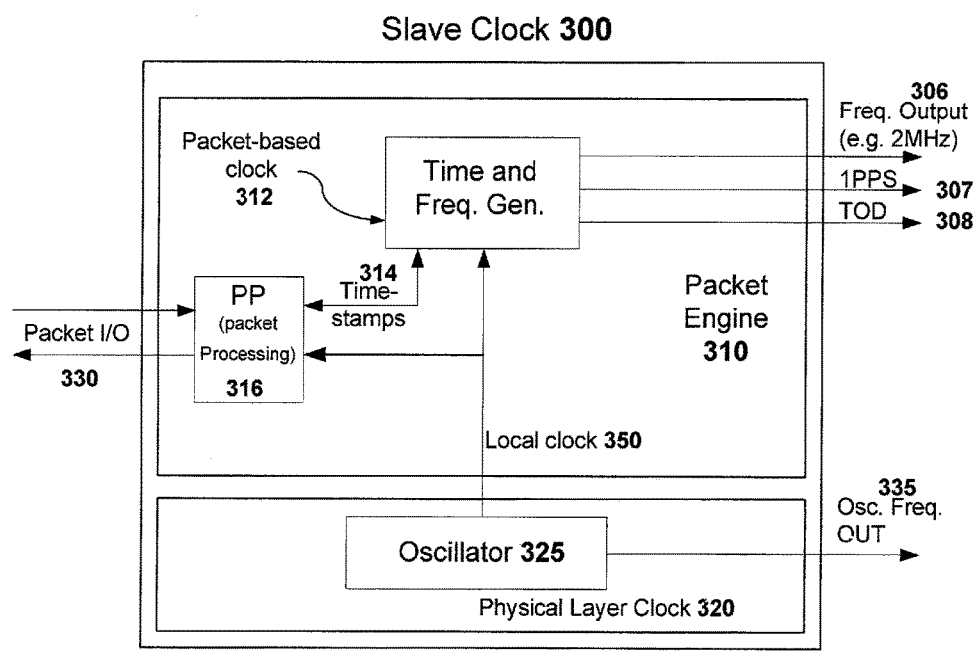
FIG. 3 is a conceptual diagram that depicts the principal functional blocks of a PTP (Precision Timing Protocol) Slave clock 300.

A typical slave clock can be depicted as shown in FIG. 3. The slave receives a packet-based timing reference based on the techniques described above. The time and frequency generation is done in the packet-based-clock 312 that is typically part of a greater packet engine 310. Local outputs of time and frequency (306, 307, 308) are provided. Time-stamping is achieved in a packet-processing function 316 that uses the local clock 350 from oscillator module 325. The oscillator module provides a physical-layer clock. Packets enter and exit the slave clock via traditional packet I/O methods 330, e.g. Ethernet. An output providing the physical layer clock 335 is common.

Conventional time-stamping units are based on the local clock. Software techniques are applied to translate the numerical value of the time-stamp generated by time-stamping unit to account for any frequency offset (frequency inaccuracy) of the local clock. Specifically, if the value provided by the hardware time-stamping unit is x, the true time-stamp value y is computed as $$y = v \cdot x + \mu \quad \text{(Eq. 3)}$$

where v is the fractional frequency offset of the local clock and μ is a phase offset representing the notion that the time-stamping counter may not have a count of "zero" at the epoch of the time-base being considered. Heretofore, it was necessary for the software of the packet-based clock to continually estimate the correction terms v and μ and apply them to every time-stamp value provided by the hardware time-stamper. In many cases the packet-based clock algorithm relies on the difference of time-stamps and in that situation it is not really necessary to factor in the phase offset correction into the time-stamp values unless there has been a revision of the phase offset value and, further, this phase offset value correction is required only if the two time-stamps involved in the subtraction operation require different phase offsets.

Figure 4:
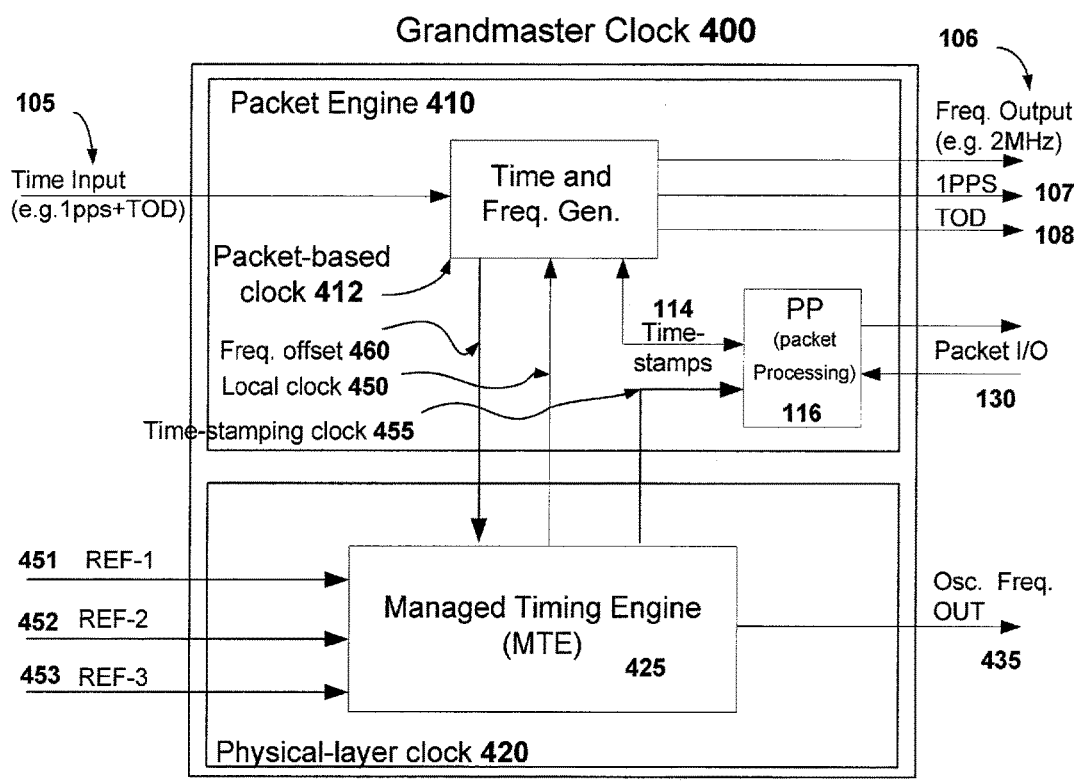
FIG. 4 is a conceptual diagram that depicts the principal functional blocks of a PTP (Precision Timing Protocol) Grandmaster clock 400 that incorporates a Managed Timing Engine.

In one embodiment of the managed timing engine 425 as applied to a Grandmaster clock 400, the managed timing engine is provided multiple timing references. FIG. 4 assumes three timing references 451, 452, and 453. Not explicitly shown is the control that chooses which reference (or references) is (are) used to generate the physical layer clock signal. One version of this signal is provided as the local clock to the packet-based clock 412. Another, possibly the same, version can be provided as a frequency output 435. Most commonly the frequency output 435 is a low-phase-noise signal suitable for operating radio-frequency circuitry. The Managed Timing Engine provides the variety of output signals suitable for different functions. The software of the packet-based clock provides the frequency offset correction 460 to the managed timing engine 425 so that the time-stamping clock frequency is aligned with the time-base and thereby no correction is required for frequency offset. The Managed Timing Engine 425 provides this low-jitter clock signal 455 to the packet processing block 116 for generating the precise hardware time-stamps 114 for the incoming and outgoing packets.

Figure 5:
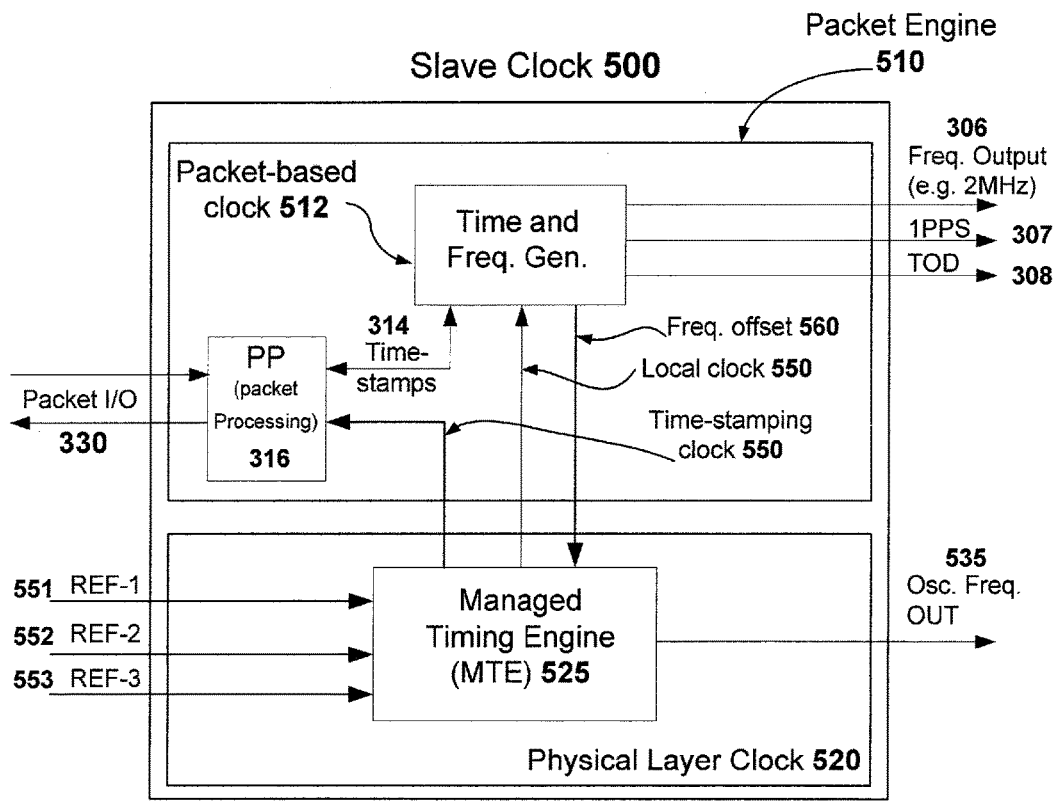
FIG. 5 is a conceptual diagram that depicts the principal functional blocks of a PTP (Precision Timing Protocol) Slave clock 500 that incorporates a Managed Timing Engine.

FIGS. 4 and 5 depict embodiments of the Managed Timing Engine (MTE) applied to provide "physical layer assist" to PTP clocks. Whereas the figures indicate usage of an MTE in Grandmaster and Slave clocks, it is straightforward to use the MTE in devices that have both slave and master functions, such as a PTP boundary clock.

Figure 6:
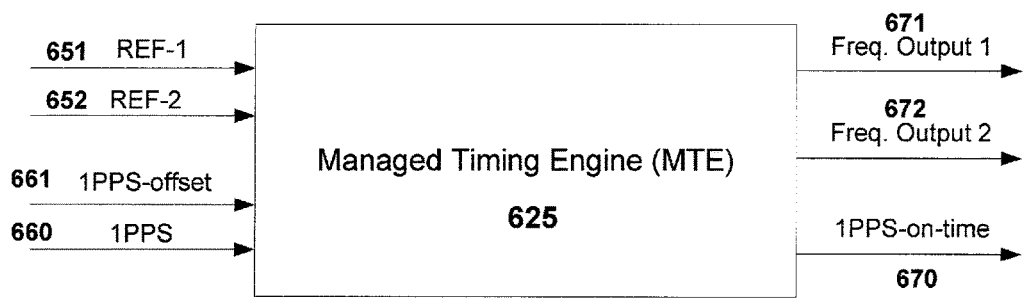
FIG. 6 is a conceptual black-box view of a Managed Timing Engine 625 that provides a programmable delay for a 1PPS signal.

The Managed Timing Engine (MTE) can be used to re-time 1PPS signals. As shown in FIG. 6, the MTE 625 is provided with frequency references 651 and 652 (and possibly more) as well as a 1PPS input 660. It is possible that the 1PPS generator providing this reference 660 does not provide the 1PPS "on-time" but with a known offset in time that is provided in the form of a message depicted as 1PPS-offset 661 in FIG. 6. The MTE provides a 1PPS output, "1PPS-ontime", corresponding to a 1PPS signal offset from the input by the amount specified via 661.

Figure 7:
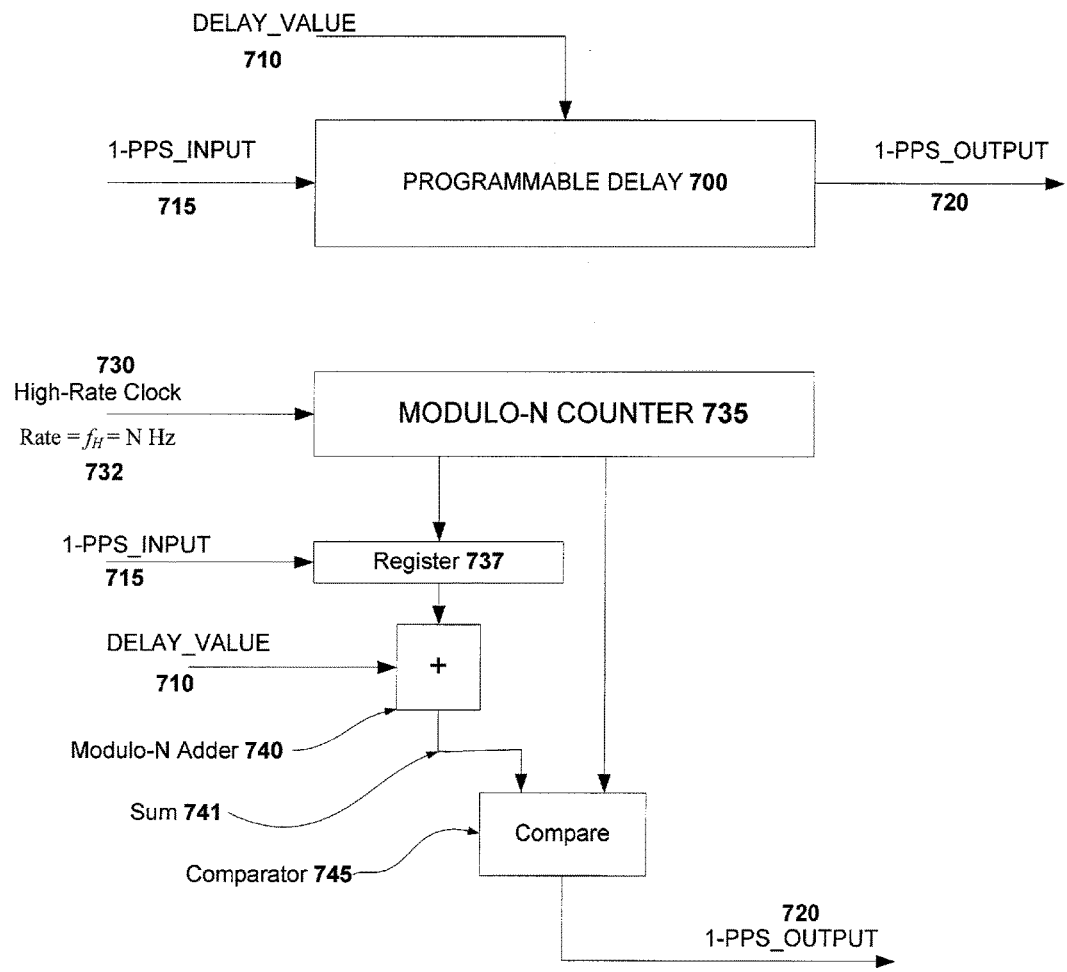
FIG. 7 provides a schematic view of the programmable 1PPS delay method.

The offset introduced can be achieved using the scheme depicted in FIG. 7. The function is that of a programmable delay 700 that has the 1PPS input 715 and a delay value input 710 and generates a 1PPS output 720 that is offset from the input 1PPS by the delay value 710. One embodiment for achieving this programmable delay is depicted in FIG. 7 as well. The MTE has circuitry that generates a high-speed clock 730 that is aligned with a chosen frequency reference (the input 1PPS is also a valid frequency reference) and has a rate that in N Hz. This drives a modulo-N counter that cycles through the values from 0 through (N−1) in 1 second. The 1PPS_input 715 samples the counter in a register 737. The programmable delay value 710 is added, modulo-N, to the register. The modulo-N counter output is compared with this sum 741 and when equality occurs an output pulse that represents the 1PPS_Output 720 is generated. Some simple check circuitry is required to ensure that there is one, and only one, output pulse in every counter cycle (of 1 second). This circuitry is not explicitly shown in FIG. 7. The granularity of the 1PPS position in time is determined by the rate of the high speed clock 730 and it is advantageous to make this as high as feasible.

Figure 8:
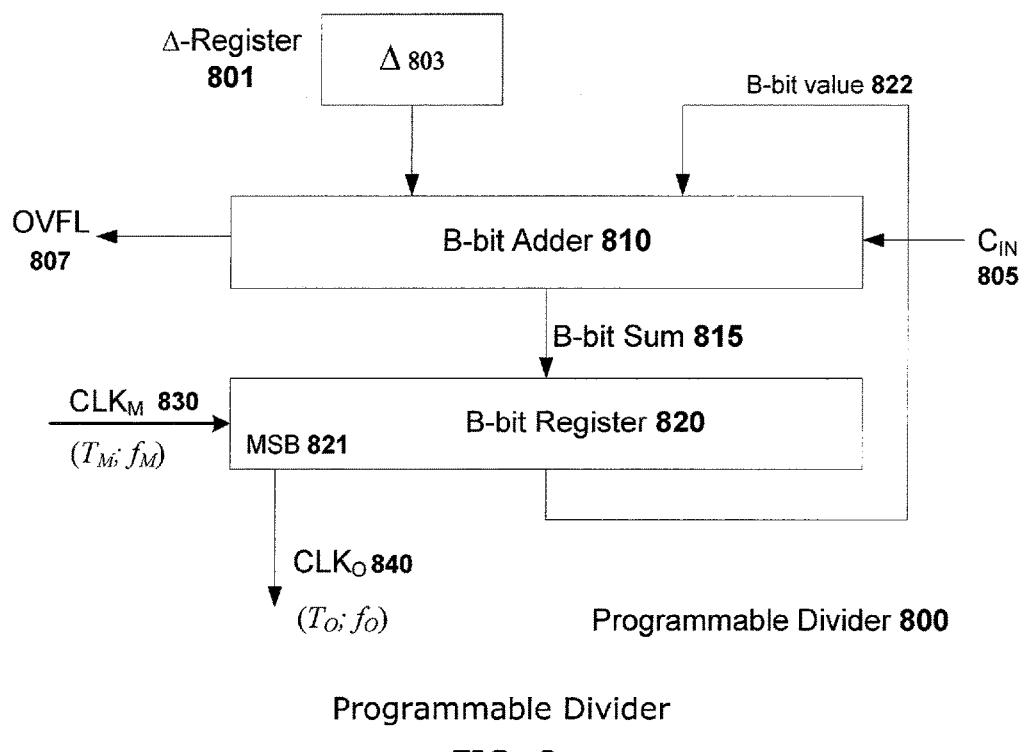
FIG. 8 provides a schematic depiction of a programmable divider (multiplier) 800.

Embodiments of the MTE include circuitry that implement a programmable divide function. Conventional divider circuits implement a fixed division ratio. A programmable division ratio is depicted in FIG. 8. The high speed clock $CLK_M$ 830 clocks the B-bit sum 815 into the B-bit register 820. The sum 815 is generated using a B-bit adder that takes the contents of the B-bit register 820, B-bit value 822, and adds to it the programmable value A 803 stored in the A-register 801. The control and method for loading the A-register 801 is not explicitly shown in FIG. 8. Denote the rate and the associated period of the high speed clock $CLK_M$ by $f_M$ and $T_M$, respectively. The equivalent of the most-significant bit of the register, MSB 821, will have a periodic pattern and can be used as the output clock $CLK_O$ 840. Denote the rate and the associated period of the output clock $CLK_O$ by $f_O$ and $T_O$, respectively. Since the arrangement shown is an accumulator that continually accumulates the value D, overflows will occur and the B-bit register 820 will cycle through a (near-)periodic pattern with period $T_O$ (and associated rate $f_O$) that are related to the high speed clock as expressed by the equations:

$$f_O \cong \left(\frac{\Delta}{2^B}\right) \cdot f_M \quad \text{(Eq. 4)}$$

$$T_M \cong \left(\frac{\Delta}{2^B}\right) \cdot T_O$$

thereby achieving the programmable division operation. Note that in terms of clock rate, the operation can be viewed as a programmable multiplier albeit a multiplication ratio less than unity.

The accumulator will routinely overflow and the signal identifying the overflow event, OVFL 807, has the same period as the output clock.

Conventional approaches to this programmable divider set the carry-in of the adder, $C_{IN}$ 805, as zero. Enhancements can be achieved by making this carry-in input $C_{IN}$ 805 a pulse-modulated signal, generated by a delta-sigma-modulator, representing a fraction, say "x". In that case the programmable divide operation achieves the following ratio:

$$f_O \cong \left(\frac{\Delta + x}{2^b}\right) \cdot f_M \quad \text{(Eq. 5)}$$

$$T_M \cong \left(\frac{\Delta + x}{2^B}\right) \cdot T_O$$

The multiplication ratio can be adjusted by a granularity of $2^{-B}$ and consequently with B>30 the frequency adjustment can be made with a granularity finer than 1 ppb ($1 \times 10^{-9}$).

Figure 9:
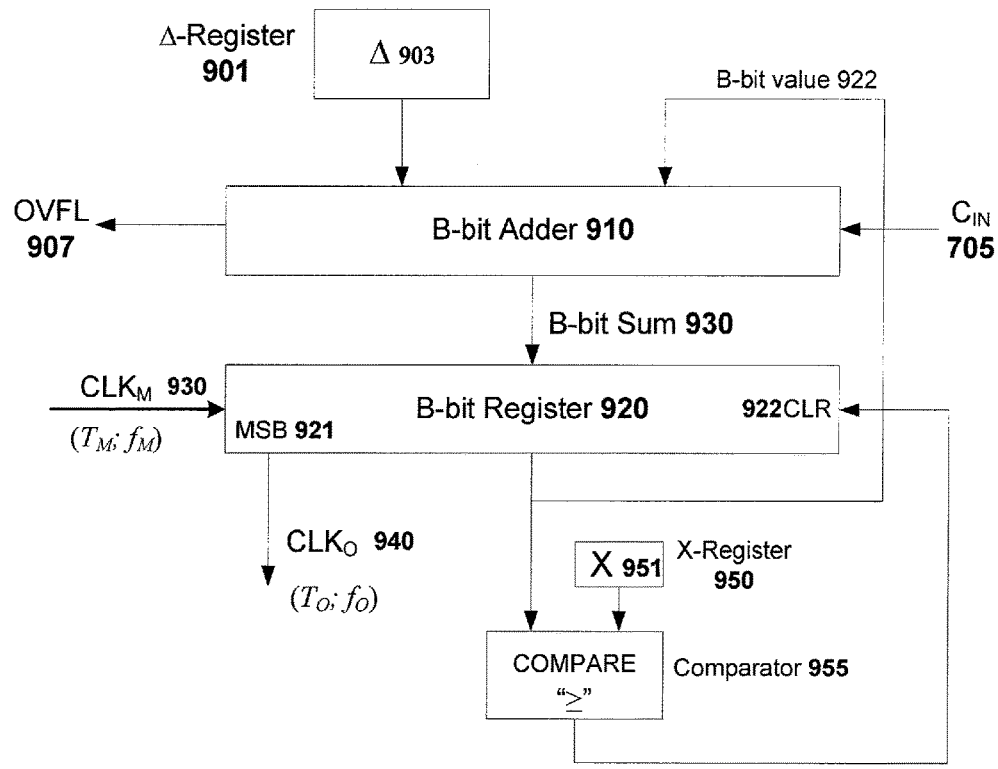
FIG. 9 provides a schematic depiction of an enhanced programmable divider (multiplier).

An enhanced version of the programmable divider is depicted in FIG. 9. The operation of the divider is similar to that of FIG. 8 with the following enhancement. A comparator 955 is used to compare the B-bit register output value 922 with a pre-determined (programmable) value X 951 stored in a register, X-register 950. When the register value becomes greater than or equal to X the register is cleared in a synchronous manner. Consequently the effective division operation becomes:

$$f_O \cong \left(\frac{\Delta + x}{X}\right) \cdot f_M \qquad \text{(Eq. 6)}$$
$$T_M \cong \left(\frac{\Delta + x}{X}\right) \cdot T_O$$

and this provides much finer control of the division (multiplication) ratio than the conventional method.

Figure 10:
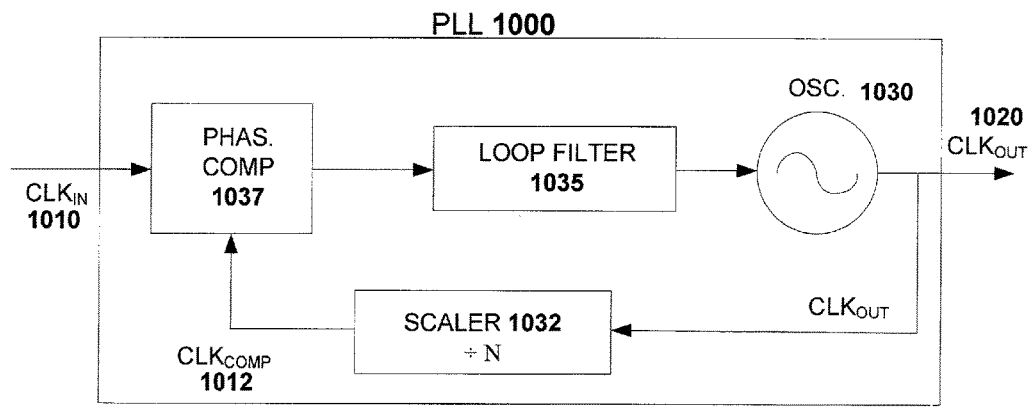
FIG. 10 depicts the principal functions in a phase-locked loop (PLL) 1000.

The MTE employs phase-locked-loop (PLL) methods for generating a clock signal with rate N times the input clock rate. A PLL 1000 is depicted in FIG. 10. The PLL includes a controlled oscillator 1030 of nominal frequency $f_{OUT}$ which is N times the rate of the input clock $CLK_{IN}$ 1010, $f_{IN}$. The output of 1030, CLKOUT 1020 is divided by N using divider (scaler) 1032, to generate $CLK_{COMP}$ that is compared with the input clock signal using a phase comparator 1037. The phase error signal is filtered using a loop filter 1035 to generate the control signal applied to 1030.

For non-integer values for "N", the scaler 1032 can be substituted by a programmable divide circuit such as that shown in FIG. 8 or one shown in FIG. 9.

Figure 11:
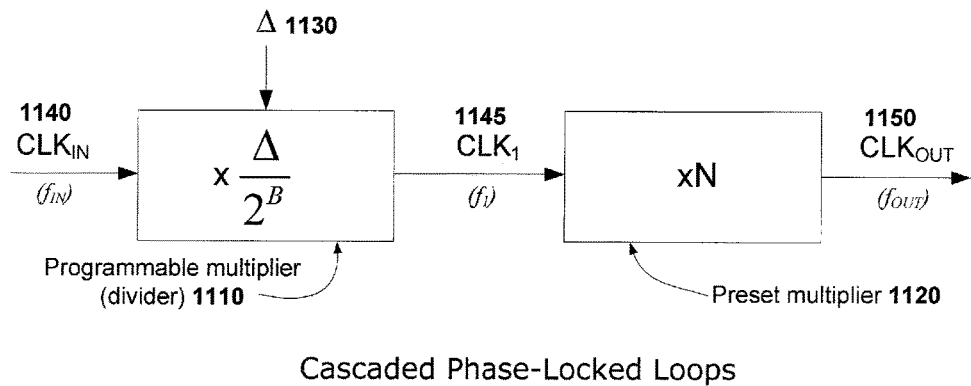
FIG. 11 depicts a cascaded version of PLLs suitable for generating signals with small frequency offsets.

The cascaded PLL structure depicted in FIG. 11 is suitable for multiplying an input reference, denoted by $CLK_{IN}$ 1140 to generate an output clock $CLK_{OUT}$ 1150, with an intermediate step generating $CLK_1$ 1145. Note that the order of the programmable and preset multipliers is interchangeable. The programmable value Δ 1130 permits the generation of a given $CLK_{OUT}$ rate ($f_{OUT}$) for a wide selection of input rates $f_{IN}$. In one embodiment of the Managed Timing Engine the given $CLK_{OUT}$ rate is 10 MHz. The value of Δ 1130 is determined by the rate of the selected reference input (e.g. REF-1 451/551 or REF-2 452/552 or REF-3 453/553). The PLL generating the 10 MHz output utilizes the main oscillator of the Managed Timing Engine, the oscillator that generally has the high stability characteristic desired of the clock subsystem in telecommunication equipment. This main oscillator output is generally characterized by low phase noise and is suitable for the output 435/535.

Figure 12:
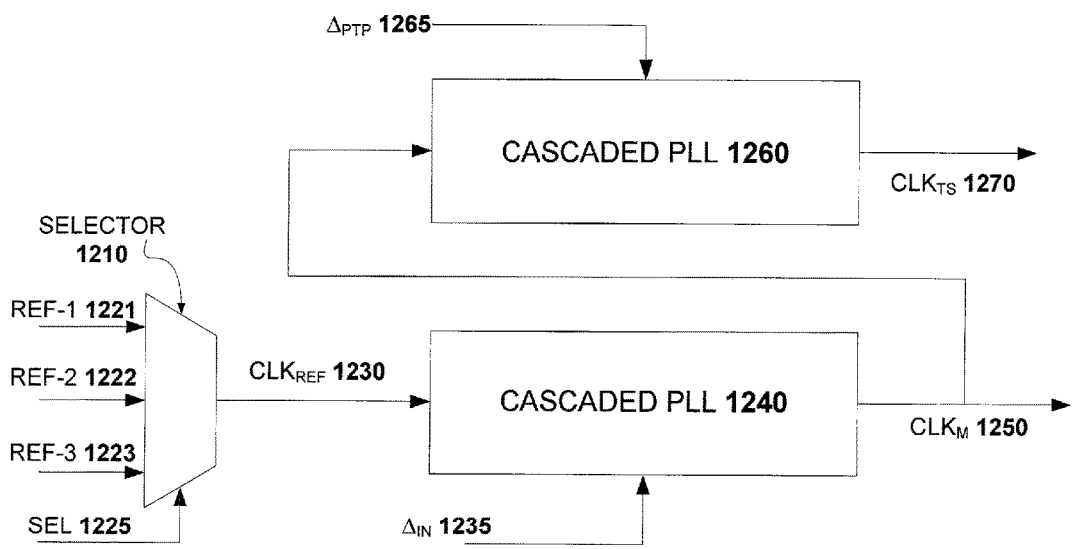
FIG. 12 depicts the key elements of a Managed Timing Engine suitable for providing the multiple clocks for PTP (Precision Timing Protocol) applications.

One embodiment suitable for application in a PTP clock (Grandmaster or Slave or Boundary clock) such as MTE 425 or MTE 525 is depicted in FIG. 12. For convenience three reference inputs are depicted, denoted by REF-1 1221, REF-2 1222, and REF-3 1223. A control mechanism, not explicitly indicated in FIG. 12, chooses the desired reference using a selector circuit 1210 via a selector control signal SEL 1225. The selected reference is denoted as $CLK_{REF}$ 1230 that feeds a cascaded PLL unit 1240 to provide the "master clock signal" $CLK_M$ 1250, typically 10 MHz. Depending on the rate of the chosen reference the control mechanism provides the programmable value $\Delta_{IN}$ 1235. This master clock signal can serve as the "Oscillator frequency OUT" signal 435/535 as well as the "local clock" signal 450/550. The "Frequency Offset" introduced between the local clock and the time-stamping clock (460/560) is used for the programmable value $\Delta_{PTP}$ 1265 of cascaded PLL unit 1260 to generate the time-stamping clock output $CLK_{TS}$ 1270.

Suppose that the chosen reference for the physical layer clock was REF-1 1221. This serves as the reference for generating the "master clock" $CLK_M$ 1250. The relative frequency offset between the chosen reference and any other reference, for example REF-2 1222, can be evaluated using the embodiment of DPLL shown in FIG. 13. The divide ratios are chosen such that there is a nominal comparison frequency $f_{COMP}$ 1360 and 1361. The two versions are compared using a clock phase comparator 1320. The phase difference signal is filtered using filter 1330 to generate the correction term for the programmable divider 1350. In steady state the correction term is proportional to the frequency offset between REF-1 and REF-2.

Different configurations are possible for a Managed Timing Engine, representing suitability for different applications. These include:

A. Simple clock generator. In this configuration there is one frequency reference that is used to discipline a low-phase-noise oscillator (typically 10 MHz) for a single frequency output. This reference may come from a physical-layer clock-recovery unit such as that in a Synchronous Ethernet application. In other situations this reference may be derived from a radio frequency carrier such as that present in a FM radio transmission.

B. Multiple clock generator. In this configuration there could be multiple references of which one is selected to discipline a high-stability oscillator. Multiple outputs may be provided, including outputs that have a frequency offset from the high-stability oscillator. FIG. 12 indicates an embodiment of a multiple clock generator. The offset could be programmable or selected to be the offset between the main reference provided to the high-stability oscillator and any second reference provided to the MTE.

C. Programmable delay for 1PPS. This configuration includes either a simple or multiple clock generator as well as a delay mechanism as depicted in FIG. 7.

D. In some embodiments the PTP clock function could be included in the MTE. For example, the entire Grandmaster clock 400 (FIG. 4) or the entire Slave clock 500 (FIG. 5) could be the Managed Timing Engine.

E. In some embodiments a GNSS/GPS receiver could be included so an internal source of 1PPS is available in the MTE.

Embodiments of the disclosure can include a programmable divider. Details of the programmable divider are illustrated in FIGS. 8 and 9 and described in paragraphs 38 thru 42.

Figure 13:
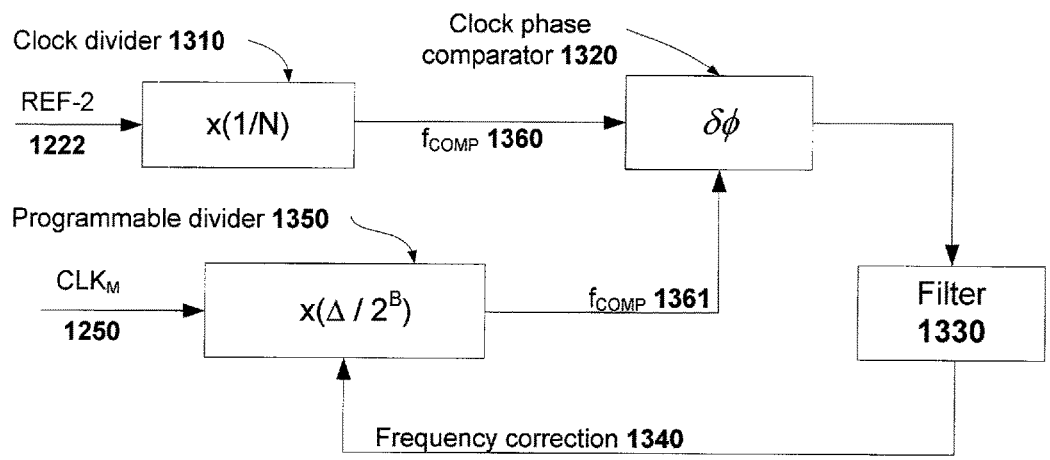
FIG. 13 depicts a scheme for estimating the frequency offset between an input reference and the main clock.

Embodiments of the disclosure can provide the basis for supporting multiple timing domains. For example, the references could be from different sources (GPS and a separate PTP-based reference) and require a small relative frequency offset. The overall block diagram is FIG. 6. Inside the block 625 can be multiple instances of PLLs (FIG. 10). One of them can be "analog" and the others can be "digital" as in FIG. 13. FIG. 13 functions as a PLL but clearly the frequency correction value also serves as a measurement representing the frequency offset between 1222 and 1250. Implicit in FIG. 13 is that in steady state the clock signal 1361 (derived from 1250) is locked to 1360 (derived from 1222).

Embodiments of the disclosure can provide the basis for providing multiple rates that are different by a small frequency offset. This provides one approach to mitigate EMI (electromagnetic interference). This can be achieved by adding a small frequency offset (see FIG. 11, detail 1130) to delta-1130. That is, there can be several instantiations of FIG. 11 with (small) differences in delta-1130. See also FIG. 12.

Embodiments of the disclosure can include techniques for providing a programmable delay (for example for a 1PPS). Details of the programmable delay are illustrated in FIG. 7 and described in paragraph 37.

Embodiments of the disclosure can include techniques for precisely measuring frequency offset (small frequency offset). Embodiment of the disclosure can include integrating functions (see paragraphs 52-53).

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be combined in the disclosed configurations, but could be combined in any and all configurations.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. A method, comprising operating a managed timing engine that provides
   a physical-layer timing output aligned to a physical-layer input timing reference using a phase locked loop, the physical-layer input timing reference selected from a multiplicity of physical-layer input timing references, and
   a packet-based clock providing timing outputs synchronized to a packet-layer input timing reference,
   wherein the managed timing engine has programmable multipier ratios for each of the physical-layer references,
   wherein a time-stamping clock in the packet-based clock is derived from a physical-layer clock,
   wherein the packet-based clock timing outputs include a 1-PPS signal with a programmable delay offset and
   wherein at least one of the multiplicity of physical-layer input timing references that are not selected is measured against the physical-layer input timing reference that is selected using a digital phase lock loop where divider and multiplier factors are chosen to generate two nominal comparison frequency versions that are compared using a clock phase comparator and a phase differences signal is filtered to generate a correction term for a programmable multiplier.

2. The method of claim 1, wherein the packet-based clock timing outputs include a frequency output, and further comprising controlling the time-stamping clock by steering the physical-layer clock with frequency corrections derived from the packet-based clock.

3. The method of claim 1, further comprising supporting multiple timing domains by providing another timing output synchronized to another input reference selected from the multiplicity of physical-layer input timing references.

4. The method of claim 1, further comprising providing multiple rates that are different by a small frequency offset.

5. The method of claim 1, further comprising providing a programmable delay.

6. The method of claim 1, further comprising measuring frequency offset.

7. The method of claim 1, further comprising using another time-stamping clock derived from the physical-layer clock without steering and with frequency corrections derived from the packet-based clock applied as a mathematical correction to time-stamps developed in a time-stamper.

8. The method of claim 1 wherein the packet-based clock timing outputs include a 1 pulse-per-second (1 PPS) output with a Time-of-Day (TOD) message indicating a time at a 1 PPS event.

9. An apparatus, comprising a managed timing engine that includes
   a primary timing output aligned to a selected input timing reference using a phase locked loop, the selected input timing reference selected from a multiplicity of input timing references and
   a packet-based clock providing timing outputs synchronized to a packet-layer input timing reference,
   wherein the managed timing engine includes a divider circuit having a programmable multiplier ratio,
   wherein a time-stamping clock in the packet-based clock is derived from a physical-layer clock
   wherein the packet-based clock timing outputs include a 1-PPS signal with a programmable delay offset and
   wherein at least one of the multiplicity of physical-layer input timing references that are not selected is measured against the physical-layer input timing reference that is selected using a digital phase lock loop where divider and multiplier factors are chosen to generate two nominal comparison frequency versions that are compared using a clock phase comparator and a phase differences signal is filtered to generate a correction term for a programmable multiplier.

10. A method, comprising operating a managed timing engine that provides
    a physical-layer timing output aligned to a physical-layer input timing reference using a phase locked loop, the physical-layer input timing reference selected from a multiplicity of physical-layer input timing references and
    a packet-based clock providing timing outputs synchronized to a time input reference,
    wherein the managed timing engine has programmable multiplier ratios for each of the physical-layer references,
    wherein the time-stamping clock in the packet-based clock is derived from a physical-layer clock
    wherein the packet-based clock timing outputs include a 1-PPS signal with a programmable delay offset and
    wherein at least one of the multiplicity of physical-layer input timing references that are not selected is measured against the physical-layer input timing reference that is selected using a digital phase lock loop where divider and multiplier factors are chosen to generate two nominal comparison frequency versions that are compared using a clock phase comparator and a phase differences signal is filtered to generate a correction term for a programmable multiplier.

11. The method of claim 10, including controlling the time-stamping clock by steering the physical-layer clock with frequency corrections derived from the packet-based clock.

12. The method of claim 10, further comprising using another time-stamping clock derived from the physical-layer clock without steering and with frequency corrections derived from the packet-based clock applied as a mathematical correction to time-stamps developed in a time-stamper.

13. The method of claim 10 wherein the packet-based clock timing outputs include a 1 pulse-per-second (1 PPS) output with a Time-of-Day (TOD) message indicating a time at a 1 PPS event.

14. The method of claim 10 wherein the packet-based clock timing outputs include packet timing signals including PTP and/or NTP.

* * * * *